Feb. 4, 1969  R. L. AGEE  3,425,721

APPARATUS FOR CONNECTING ADJACENT MITERED MEMBERS

Filed March 30, 1967

INVENTOR.
ROBERT L. AGEE
BY
*Dunlap and Laney*
ATTORNEYS

United States Patent Office 3,425,721
Patented Feb. 4, 1969

3,425,721
APPARATUS FOR CONNECTING ADJACENT
MITERED MEMBERS
Robert L. Agee, P.O. Box 75248,
Oklahoma City, Okla. 73107
Continuation-in-part of application Ser. No. 506,427,
Oct. 20, 1965. This application Mar. 30, 1967, Ser.
No. 627,020
U.S. Cl. 287—20.92                          2 Claims
Int. Cl. F16b 7/00

ABSTRACT OF THE DISCLOSURE

A pair of wooden or other rigid members are cut along lines such that a mitered junction is formed when the members are abutted along the cut edges. Holes are drilled into the members adjacent the cut edges so that the hole in each of the members opens at the cut edge, as well as at a face of the member. Each hole is angled with respect to the plane of the end face of the member developed by cutting, with the axis of the hole diverging from this end face. When the members are abutted in miter joint fashion, the holes in adjacent members communicate, and their axes diverge from each other. A figure 8-shaped holding member is pressed down in the two holes, and in being placed in tension, retains the two members in abutting contact.

BACKGROUND OF THE INVENTION

Reference to prior applications

This application is a continuation-in-part of my application Ser. No. 506,427 filed Oct. 20, 1965, and now abandoned, for a Method and Apparatus for Connecting Adjacent Members, which application is a continuation-in-part of my application Ser. No. 456,207 filed May 17, 1965, also entitled Method and Apparatus for Connecting Adjacent Members.

Field of the invention

This invention relates generally to improved methods and apparatus for connecting adjacent members through a miter joint.

Description of the prior art

Many methods and apparatuses have been proposed in the past for joining members cut along complementary angles through a miter joint. The most common method of forming miter joints, after the two members to be joined through the joint have been cut at the desired angle, is to place an adhesive on one or both of the end (cut) surfaces, and then place the end surfaces in abutting contact and drive nails or screws through one of the members into the other. It is then necessary to fill the nail holes so that they will be as inconspicuous as possible. In some instances, a corrugated fastener is driven into the rear surface of the members and bridges across the joint. In performing these operations, unless extreme care is utilized, the front surface of the two members being joined through the miter joint will be marred. The difficulty of the joining operation has made it virtually impossible for the layman to manually prepare neat and well-made picture frames which include a plurality of members joined at the corners of the frame through miter joints.

BRIEF DESCRIPTION OF THE INVENTION

The present invention provides an improved method and apparatus for joining two members to each other through a miter joint. Broadly described, the method comprises drilling a hole into each of the members adjacent the angle cut on each member at the location where the joint is to be made so that such hole intersects the angled edge of the member or, stated differently, has an open side adjacent this edge of the member. The hole, moreover, is drilled on an angle with respect to the plane of the end face or surface of the member which is to abut against a corresponding end face or surface of the second member when the miter joint is formed. The angle formed by the hole with the end surface of the member is such that the center of the bottom of the hole is disposed more remotely with respect to this edge face or surface than is the center of the top of the hole. Stated differently, the hole diverges from the end face or surface as the hole is propagated downwardly into the member.

The holes or recesses formed in the two members to be joined through a miter joint are positioned in each member so that, when the two members are properly positioned to form the joint, the two holes are aligned and communicate with each other through their sides opening at the abutting edges of the two members. The effect, when viewed in plan, is a generally figure 8-shaped recess formed conjunctively by the two holes. Into this recess is placed a holding member which is also of generally figure 8 configuration. Due to the divergence of the holes from each other by reason of their angulation with respect to the abutting end surfaces of the two members, the holding member, when pressed downwardly in the holes, will be stretched or placed in tension with the result that the two members are drawn toward each other, and the abutting faces are held in firm contact with each other in the miter joint. In a preferred method of practicing the invention, an adhesive is placed on at least one of the end surfaces of the members prior to joining them in the manner described, and adhesive may also be placed in the holes over the holding member after the holding member has been pressed into position.

From the foregoing brief description of the invention, it will have become apparent that it is an important object of the invention to provide an improved apparatus for joining two members to each other through a miter joint.

An additional object of the invention is to provide an improved method for joining two members to each other through a miter joint.

Another object of the invention is to provide an improved apparatus for forming a miter joint between two members that eliminates the need for complex jigs and fixtures.

An additional object of the invention is to provide an improved apparatus for forming miter joints that eliminates the necessity for using nails to hold the joint.

Another object of the invention is to provide an improved apparatus for joining two members whereby the joint may be quickly and easily formed.

Yet another object of the invention is to provide an inexpensive apparatus for constructing picture frames and similar structures involving miter joints, such construction being possible without great skill and accuracy being required, and without time consuming and tedious operations being necessary.

The foregoing and additional objects and advantages of the invention will become more apparent as the following detailed description is read in conjunction with the accompanying drawings which illustrate the invention.

DESCRIPTION OF A PREFERRED EMBODIMENT OF THE INVENTION

Figure 1:
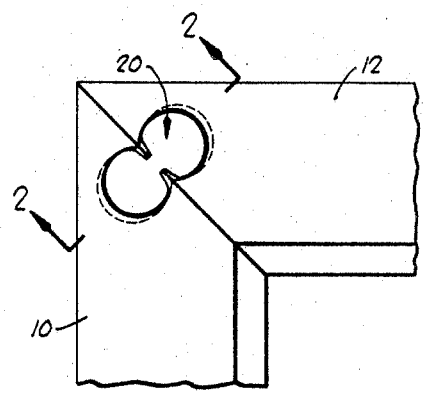
FIGURE 1 is a plan view of a miter joint constructed in accordance with the invention.

In FIGURE 1 of the drawings, there are shown two members 10 and 12 which are to be joined to each other through a miter joint. These members, as illustrated, can be the types of members which are provided in picture frames and the like in which it is undertaken to extend the members at a right angle to each other, and to abut the ends of the members along a line which extends at forty-five degrees with respect to the longitude axis of each member. Joints of this type are well known in the art. It should be pointed out, however, that the present invention is applicable to the joining of two members to each other at angles other than ninety degrees, and it will be perceived as the description of the invention proceeds that the general principles which render the invention operative are applicable to other angulations of the members than that which is shown in FIGURE 1.

Figure 3:
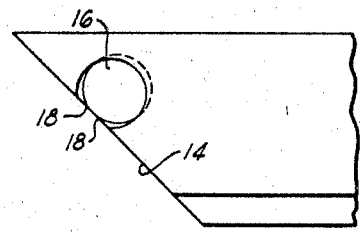
FIGURE 3 is a plan view of the end of one of the members to be joined in a miter joint and illustrating the manner in which a hole is formed therein to facilitate joining the member to a second member containing a similar hole.
Figure 5:
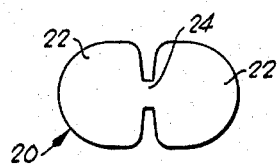
FIGURE 5 is a plan view of a holding member forming a part of the apparatus of the present invention.
Figure 4:
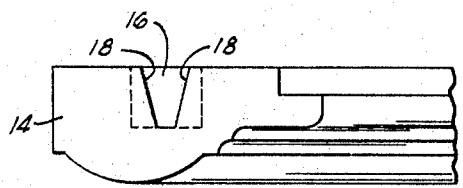
FIGURE 4 is a view in end elevation of one of the end surfaces of two members to be joined through a miter joint.
Figure 6:
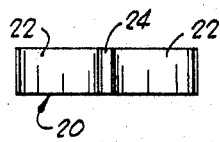
FIGURE 6 is a view in elevation of an edge of the holding member shown in FIGURE 5.

Each of the members 10 and 12 has an end face or surface similar to that which is shown in FIGURE 4, and which is there designated by reference numeral 14. The end faces 14 are, as indicated, disposed in substantially a common plane, and abut along a common line at such time as the two members 10 and 12 are mated to form the miter joint. In juxtaposition to the end face of each of the members 10 and 12, a generally cylindrical hole or recess 16 is drilled in the respective member. It will be noticed in referring to FIGURES 3 and 4 that each hole or recess 16 is drilled in such a way that it intersects or overlaps the end face 14 of the respective member, and that it is drilled at an angle with respect to the plane of the edge face. Thus, the bottom of each hole or recess 16 is more remotely disposed with respect to the respective adjacent end face 14 than is the top of the recess or hole, with each hole or recess having an opening at the end face as shown in FIGURE 4. The edges 18 formed by the intersection of each hole 16 with the respective end face 14 converge toward each other at their lower ends due to the angulation of the holes with respect to their adjacent end faces.

Figure 2:
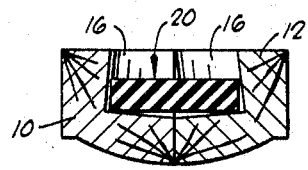
FIGURE 2 is a sectional view taken along line 2—2 of FIGURE 1.

In order to complete the miter joint and firmly interconnect the members 10 and 12 to each other, the two members are placed in the position shown in FIGURE 1 with the opening of the holes both facing in the same direction or, stated differently, opening on the same sides of the members 10 and 12. In many instances, it will be desirable to initially place glue or other suitable adhesive along the end face 14 of each of the members prior to placing them in abutting contact as shown on FIGURE 1. With the members 10 and 12 positioned so that the two holes 16 in the members are in communication through their respective openings in the adjacent end faces 14 of each member, a holding member 20, which is constructed of a resilient material such as rubber, and may be described as being of a figure 8 configuration, is pressed into the holes 16 as depicted in FIGURES 1 and 2. The holding member 20 may be differently described as including a pair of enlarged end portions 22 which are interconnected by a thin web portion 24. One of the enlarged end portions 22 is pressed into each of the holes 16 with the web portion 24 spanning across to the parting plane along which the members 10 and 12 are joined. The holding member 20 is then pressed downwardly into the holes 16 with the result that in following the contour of the cylindrical holes, the two enlarged end portions 22 of the holding member are moved away from each other, and the web portion 24 of the holding member is placed in tension. The result is that when the holding member 20 rests on the bottom of the two holes 16 as depicted in FIGURE 2, the web portion 24 of the holding member is stretched, and the tension thus developed in the web portion draws the end faces 14 in the members 10 and 12 into firm abutting contact with each other. It may then be desirable in many instances to place a suitable glue or adhesive in the holes 16 over the holding member 20, and other filler materials may be mixed with the glue, or placed on top thereof, to provide a smooth, finished appearance to the members 10 and 12 adjacent the joint.

From the foregoing description of the invention, it will be perceived that the present invention provides a simple method and apparatus for connecting adjacent members through a miter joint. The use of the resilient holding member permits adjustments to be made in the joint alignment until the exact fitting desired is accomplished. Further, once the joint is established, the tension developed in the resilient holding member holds the members in firm abutting contact in the joint over an extended period of time. If it is intended to later disassemble the picture frame or other member in which the joint is located, the holding member alone may be used in establishing the joint, and no adhesive need be employed. Thus, the holding member can be easily removed from the holes at such time as it may be desired to disassemble the frame by disconnection of the members 10 and 12.

Although certain preferred embodiments of the invention have been herein described in order to provide an example of the practice of the invention, it will be appreciated that various modifications and changes can be made in the described method and apparatus without departure from the principles which underlie the invention. All such changes and modifications which continue to rely upon the basic principles of the invention are deemed to be circumscribed by the spirit and scope of the invention except as the same may be necessarily limited by the appended claims or reasonable equivalents thereof.

What is claimed is:

1. Apparatus for connecting two members through a mitered joint comprising:

an end portion on each of the members, each of said end portions having a substantially monoplanar end face formed by cutting the member along a straight line, and each of said members having a hole having a generally circular cross-sectional configuration extending part of the way therethrough and originating at a surface of the respective member which intersects its respective end face, each hole being formed immediately adjacent the end face of its respective member so as to intersect the end face and form a trapezoidal opening therethrough at the side of the hole, and each hole extending at an angle with respect to its adjacent end face so as to diverge from said adjacent end face; and a resilient holding member under tension in said holes, said resilient holding member having a general figure 8-like configuration and comprising a pair of ends joined by a web, said resilient holding element being generally complementary in configuration to said holes conjunctively when said end portions are placed in juxtaposition with said end faces in abutting contact and said holes in communication through said openings in said end faces, said trapezoidal openings being sized to allow free passage of the web.

2. Apparatus as defined in claim 1 wherein said holding member is dimensioned to fit loosely in said holes at the open upper end thereof and to be stretched in said web portion as said ends of the holding member are pressed downwardly in said holes.

References Cited

UNITED STATES PATENTS

| | | | |
|---|---|---|---|
| 372,695 | 11/1887 | Merritt | 287—20.92 |
| 497,915 | 5/1893 | Fulghum et al. | 287—20.92 |
| 782,639 | 2/1905 | Bailey | 287—20.92 |
| 869,055 | 10/1907 | Burroughs. | |
| 1,723,306 | 8/1929 | Sipe | 287—20.92 |
| 2,053,382 | 9/1936 | Stickley | 287—20.92 |
| 2,083,354 | 6/1937 | Whittier | 287—20.92 |

CARL W. TOMLIN, *Primary Examiner.*

WAYNE L. SHEDD, *Assistant Examiner.*

U.S. Cl. X.R.

287—127; 52—584